US012650030B2

(12) United States Patent
Ostram et al.

(10) Patent No.: US 12,650,030 B2
(45) Date of Patent: Jun. 9, 2026

(54) INDUCTION POWERED LOCK DEVICE

(71) Applicant: Master Lock Company LLC, Oak Creek, WI (US)

(72) Inventors: Christopher T. Ostram, West Allis, WI (US); Robert R. Hollis, Waukesha, WI (US)

(73) Assignee: Master Lock Company LLC, Oak Creek, WI (US)

( * ) Notice: Subject to any disclaimer, the term of this patent is extended or adjusted under 35 U.S.C. 154(b) by 7 days.

(21) Appl. No.: 18/741,597

(22) Filed: Jun. 12, 2024

(65) Prior Publication Data

US 2025/0382827 A1      Dec. 18, 2025

(51) Int. Cl.
| | |
|---|---|
| *E05B 47/00* | (2006.01) |
| *E05B 67/22* | (2006.01) |
| *H02J 50/10* | (2016.01) |

(52) U.S. Cl.
CPC .......... *E05B 47/0012* (2013.01); *E05B 67/22* (2013.01); *H02J 50/10* (2016.02); *E05B 2047/0017* (2013.01); *E05B 2047/0024* (2013.01); *E05B 2047/0054* (2013.01); *E05B 2047/0062* (2013.01); *E05B 2047/0095* (2013.01)

(58) Field of Classification Search
CPC ....... E05B 47/0012; E05B 67/22; H02J 50/10
USPC .............................................. 70/20
See application file for complete search history.

(56) References Cited

U.S. PATENT DOCUMENTS

| | | | | |
|---|---|---|---|---|
| 6,047,575 | A | 4/2000 | Larson et al. | |
| 7,856,855 | B2 * | 12/2010 | Fantl | E05B 67/063 |
| | | | | 70/38 A |
| 8,806,907 | B2 * | 8/2014 | Kalous | E05B 67/06 |
| | | | | 70/52 |
| 8,850,858 | B2 * | 10/2014 | Nave | E05B 47/06 |
| | | | | 70/279.1 |
| 9,495,820 | B1 * | 11/2016 | Li | E05B 47/06 |
| 10,030,417 | B1 | 7/2018 | Ho | |
| 10,648,196 | B2 * | 5/2020 | Neau | E05B 65/0075 |
| 11,098,500 | B2 | 8/2021 | Gengler et al. | |

(Continued)

FOREIGN PATENT DOCUMENTS

| | | |
|---|---|---|
| CN | 102345422 | 2/2012 |
| CN | 111206833 A | 5/2020 |

(Continued)

OTHER PUBLICATIONS

International Search Report and Written Opinion, PCT/US2025/033104, Aug. 12, 2025.

(Continued)

*Primary Examiner* — Nathan Cumar

(74) *Attorney, Agent, or Firm* — Foley & Lardner LLP

(57) ABSTRACT

A lock system includes a lock. The lock includes a locking mechanism, an induction coil, and an actuator. The locking mechanism is selectively movable between a first position and a second position. The induction coil is configured to inductively couple with a portable device to generate power. The actuator is configured to actuate between a locked configuration and an unlocked configuration to selectively transition the locking mechanism between a locked state and an unlocked state in response to receiving the power generated with the induction coil.

18 Claims, 10 Drawing Sheets

(56)                References Cited

U.S. PATENT DOCUMENTS

| | | | |
|---|---|---|---|
| 11,686,124 B2 * | 6/2023 | Chang ..................... | H02J 50/12 |
| | | | 70/277 |
| 2009/0158792 A1 * | 6/2009 | Lasaroff .................. | E05B 67/24 |
| | | | 70/38 A |
| 2012/0011902 A1 * | 1/2012 | Meekma ................. | E05B 47/06 |
| | | | 70/52 |
| 2015/0345183 A1 * | 12/2015 | Taylor ..................... | E05B 73/00 |
| | | | 70/20 |
| 2017/0009491 A1 * | 1/2017 | Nguyen ............. | G07C 9/00563 |
| 2018/0075679 A1 * | 3/2018 | Niroomand ........ | G07C 9/00944 |
| 2018/0096549 A1 * | 4/2018 | Tseng .................. | E05B 47/0603 |
| 2019/0088057 A1 | 3/2019 | Gengler et al. | |
| 2019/0368233 A1 * | 12/2019 | Gengler .............. | E05B 47/0611 |
| 2020/0240174 A1 * | 7/2020 | Chang ................. | E05B 47/0012 |
| 2020/0242868 A1 | 7/2020 | Gengler et al. | |
| 2020/0285726 A1 * | 9/2020 | Kalous ................... | G06F 21/31 |
| 2020/0318390 A1 * | 10/2020 | Bartel ................ | E05B 37/0055 |
| 2021/0241552 A1 * | 8/2021 | Jonely ............... | G07C 9/00944 |
| 2022/0255349 A1 | 8/2022 | Poulin | |

FOREIGN PATENT DOCUMENTS

| | | | | | |
|---|---|---|---|---|---|
| CN | 112360248 A | * | 2/2021 | .......... | E05B 17/002 |
| CN | 114708681 A | | 7/2022 | | |
| WO | WO-2019/237853 A1 | | 12/2019 | | |

OTHER PUBLICATIONS

Office Action dated Feb. 4, 2026 from Taiwan Application No. 114121394, 19 pages.

* cited by examiner

INDUCTION POWERED LOCK DEVICE

BACKGROUND

The present disclosure generally relates to the field of locking devices. Some implementations relate more particularly to lockout-tagout ("LOTO") systems, for example, the use of wireless technology in lockout-tagout systems.

In some applications, certain areas or equipment call for multiple steps to occur prior to granting access or restricting access to the areas or equipment. These multiple steps are often intended to help ensure that certain processes are properly completed. LOTO systems can be used to support such processes.

Once a potentially dangerous piece of equipment is turned off, for example, the switch for the equipment may be locked out (e.g., using a lockout device, such as a hasp having multiple apertures) using multiple locks. Each lock typically prevents movement of the lockout device and each lock typically represents a step of a LOTO procedure. Tags are typically placed on the equipment to, e.g., warn users that the equipment is not to be used. When a safety procedure is completed, an associated lock can be removed by the authorized personnel. A policy is often established such that only the user that placed a LOTO lock or another authorized person can remove the LOTO lock. LOTO tags and locks are typically associated with different colors so that steps or personnel responsible for the tags and locks may be identified. Lockout-tagout systems are conventionally communicated, tracked, and monitored using manual processes.

SUMMARY

One embodiment relates to a lock system. The lock system includes a lock. The lock includes a locking mechanism, an induction coil, and an actuator. The locking mechanism is selectively movable between a first position and a second position. The induction coil is configured to inductively couple with a portable device to generate power. The actuator is configured to actuate between a locked configuration and an unlocked configuration to selectively transition the locking mechanism between a locked state and an unlocked state in response to receiving the power generated with the induction coil.

Another embodiment relates to a lock. The lock is selectively transitionable between a locked state and an unlocked state. The lock includes a housing, a support structure, a shackle, a bearing, a motor, a gear assembly, a retainer, an induction coil, and a printed circuit board. The housing defines an interior chamber and a first plurality of ribs. The support structure is disposed within the interior chamber, the support structure defining a first recess, a plurality of supports, and a second plurality of ribs. At least one of the plurality of supports is positioned to engage with at least one of the first plurality of ribs. The shackle is at least partially received within the interior chamber and has a notch. The shackle is configured to selectively translate between a first position and a second position. At least a portion of the shackle engages with one or more of the first plurality of ribs and one or more of the second plurality of ribs. The bearing is positioned within the interior chamber and is configured to engage with the notch of the shackle and the first recess of the support structure when the shackle is in the first position. The motor is disposed within the housing and includes a lead. At least one of the plurality of supports is positioned to support the motor. The gear assembly is coupled to the motor. The retainer is coupled to the gear assembly. The retainer defines a second recess and is rotatable between a locked configuration and an unlocked configuration. When the lock is transitioned into the unlocked state, the motor rotates the retainer into the unlocked configuration such that the second recess aligns with the bearing to permit lateral translation of the bearing such that, during translation of the shackle from the first position to the second position, the bearing translates relative to the first recess of the support structure and the notch of the shackle into engagement with the second recess of the retainer, thereby permitting translation of the shackle from the first position to the second position. The induction coil is positioned between a wall of the housing and the support structure. The printed circuit board is positioned at a lower end of the induction coil and oriented substantially perpendicular thereto. The printed circuit board defines an interface to which the lead connects. The induction coil is configured to be inductively coupled to an external device to generate power that is provided to the printed circuit board and then provided by the printed circuit board to the motor to power the motor to rotate the retainer between the locked configuration and the unlocked configuration.

Still another embodiment relates to a lock. The lock is selectively transitionable between a locked state and an unlocked state. The lock includes a housing, a shackle, at least one bearing, an actuator head, a motor, an induction coil, and a support structure. The housing defines an interior chamber. The shackle is at least partially received within the interior chamber, includes a cavity, and is configured to selectively translate between a first position and a second position. The at least one bearing is configured to engage with the cavity when the shackle is in the first position. The actuator head includes at least one pocket and is rotatable between a locked configuration and an unlocked configuration. When the lock is in the unlocked state, the actuator head is in the unlocked configuration such that the pocket faces laterally outwards to create a space to permit lateral translation of the bearing such that, during translation of the shackle from the first position to the second position, the cavity biases the bearing laterally inwards within the space to engage with the pocket of the actuator head, thereby permitting translation of the shackle from the first position to the second position. The motor is operatively coupled with the actuator head to selectively rotate the actuator head between the locked configuration and the unlocked configuration. The induction coil is configured to (i) receive power from a user device including an inductive power source in response to inductively coupling with the inductive power source and (ii) supply the power received from the inductive power source to the motor to transition the lock between the locked state and the unlocked state, thereby wirelessly powering the motor. The support structure is configured to be disposed within the interior chamber of the housing and support the shackle, the actuator head, the motor, and the induction coil. The support structure includes a pocket extending laterally along the support structure and is configured to facilitate lateral translation of the bearing.

DETAILED DESCRIPTION

Figure 1:
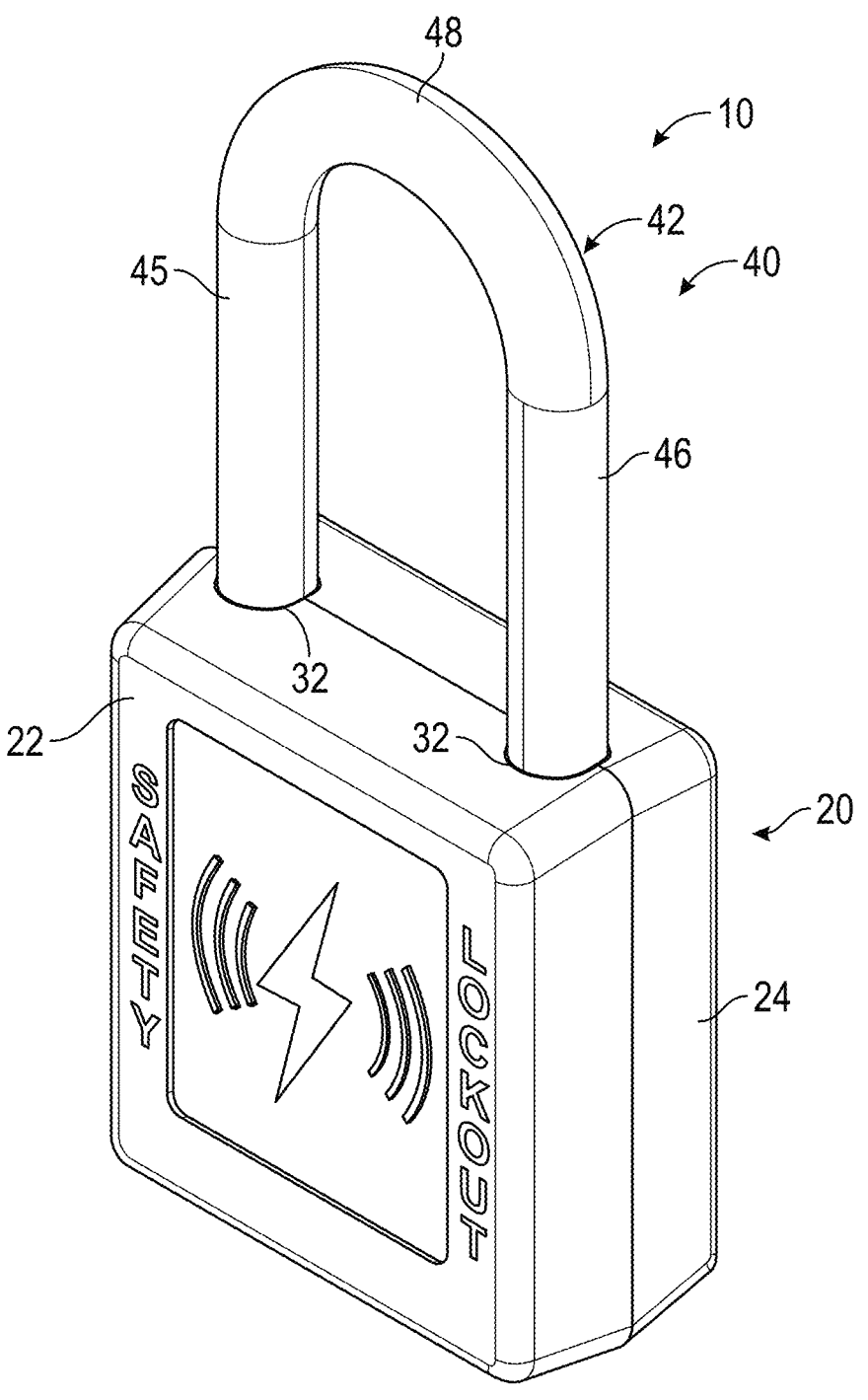
FIG. 1 is a perspective view of a lock, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, the present disclosure relates to a lock device (e.g., an induction powered lock) that includes an induction assembly for power transfer between the induction powered lock and a user device (e.g., an external power device, a mobile phone, a smartphone, an inductive coupling power source, an induction key device, etc.) including an inductive power source. The lock device may include (a) a locking mechanism that is selectively moveable between a locked position and an unlocked position and (b) an actuation assembly configured to receive power transferred from the user device (e.g., when the user device is inductively coupled with an induction coil of the induction assembly) to operate the locking mechanism. The actuation mechanism may include a motor configured to actuate the locking mechanism between a locked configuration and an unlocked configuration, thereby transitioning the lock device between a locked state and an unlocked state.

In some embodiments of the present disclosure, the locking device and the user device are part of a LOTO management system including the lock device, the user device, and a server. The user device can be positioned in proximity to the lock device to inductively communicate therewith. In response to an inductive coupling with the lock device, the user device may inductively power operation of one or more components of the lock device (e.g., the actuation assembly, a motor, etc.). Further, when the lock device and the user device are inductively coupled, they may exchange data such as lock identifiers associated with the lock device, user identifiers associated with a user, and user profiles including access credentials indicative of one or more locks the user has access to. The user device may be communicably coupled with the server via a network, thereby functioning as an intermediary device that facilitates data transmissions between the server and the lock device. The server may be configured to manage a plurality of access credentials or user profiles for a plurality of users that have access to at least one of the lock devices. The server may be configured to (a) generate and securely store lock identifiers, user identifiers, and user profiles and (b) selectively provide control commands (e.g., authorization signals associated with a command to actuate the motor of the lock device) to the user devices and the lock devices based on the permissions of the users of the user devices.

As shown in FIGS. 1-11, a lock device (e.g., lock assembly, padlock, latch, etc.), shown as lock 10, includes a body assembly, shown as housing 20; a locking assembly, shown as locking mechanism 40, selectively moveable between a locked position and an unlocked position; an actuation assembly, shown as actuator 60, disposed within the housing 20 and configured to selectively move the locking mechanism 40 between the locked position and the unlocked position to transition the lock 10 between a locked state and an unlocked state; an induction system, shown as induction assembly 80, operatively coupled with the actuator 60 to provide power to the actuator 60 when coupled to an inductive power source; and a support structure, shown as internal support 90, disposed within the housing 20 and configured to at least partially support the locking mechanism 40, the actuator 60, and the induction assembly 80.

Figure 2:
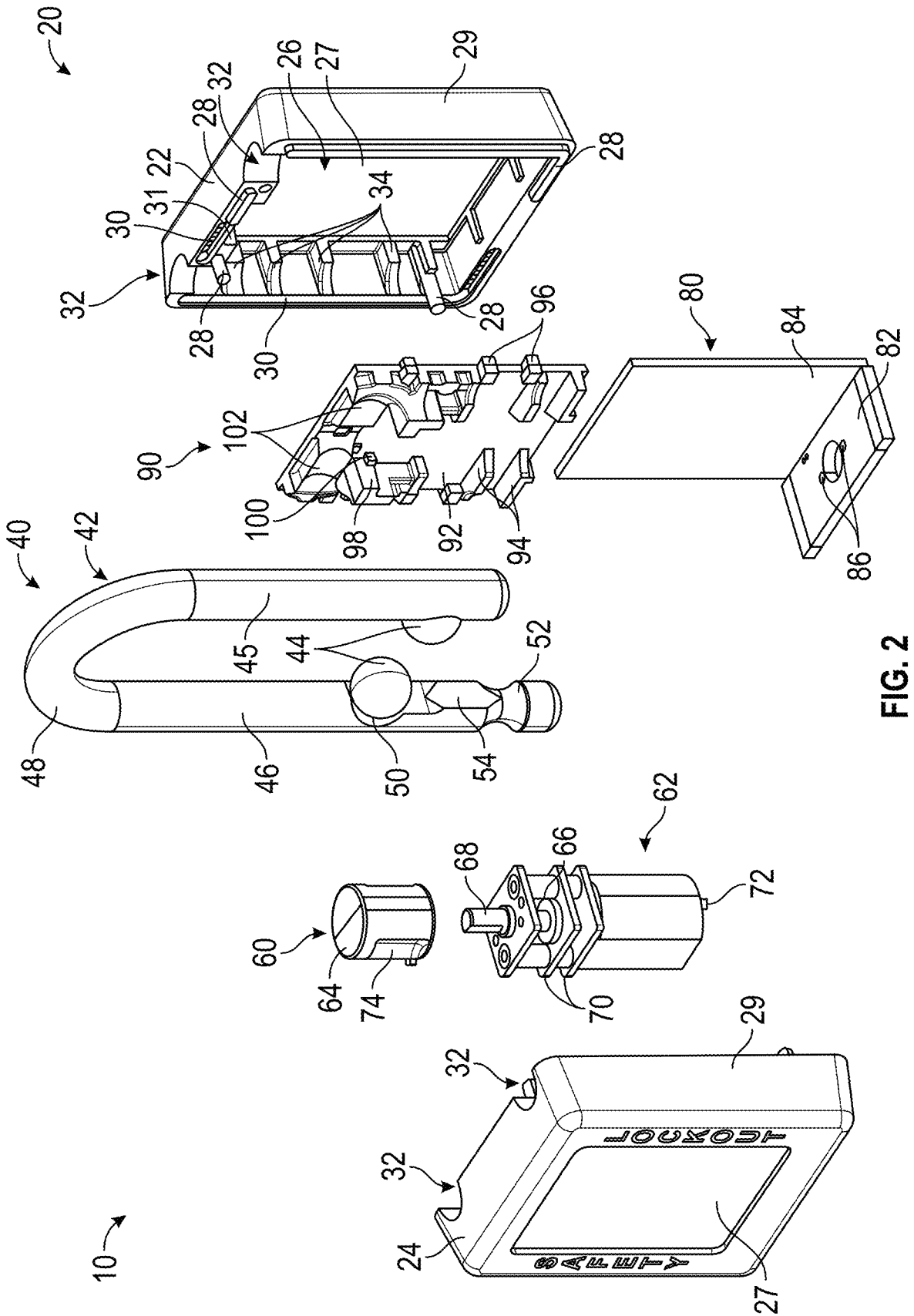
FIG. 2 is an exploded view of the lock of FIG. 1 including a housing, a locking mechanism, an actuation assembly, an induction assembly, and a support structure, according to an exemplary embodiment.
Figure 3:
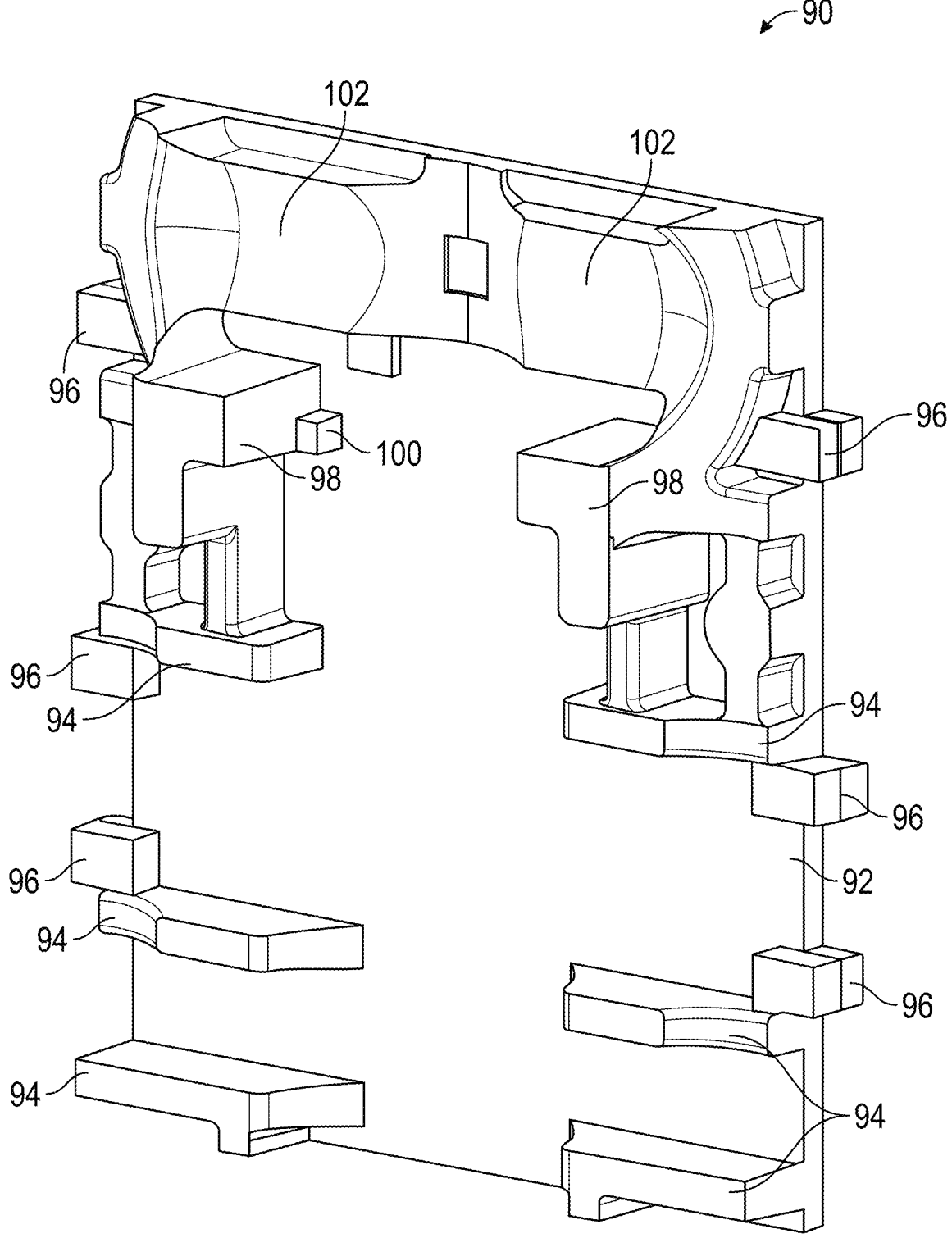
FIG. 3 is a front perspective view of the support structure of the lock of FIG. 1, according to an exemplary embodiment.

As shown in FIGS. 1 and 2, the housing 20 includes a first portion (e.g., cover, casing, etc.), shown as first shell 22, and a second portion (e.g., cover, casing, etc.), shown as second shell 24, configured to couple with each other to form an interior cavity, shown as interior chamber 26, sized to receive one or more components or assemblies of the lock 10 (e.g., the locking mechanism 40, the actuator 60, the induction assembly 80, the internal support 90, etc.).

Figures 6, 7:
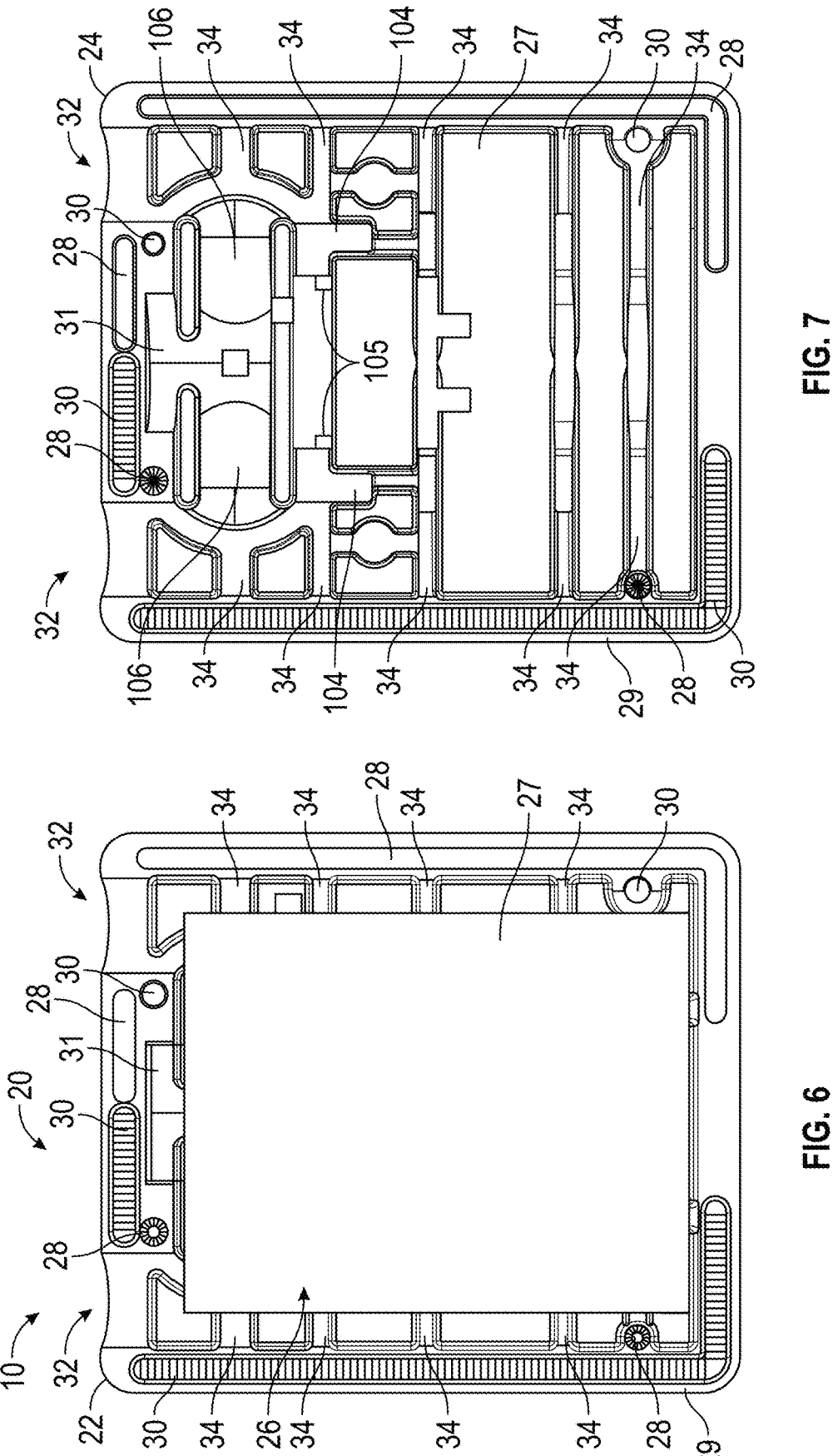
FIG. 6 is an interior view of a first shell of the housing of the lock of FIG. 1, according to an exemplary embodiment.
FIG. 7 is an interior view of a second shell of the housing of the lock of FIG. 1, according to an exemplary embodiment.

As shown in FIGS. 2, 6, and 7, each of the first shell 22 and the second shell 24 includes an exterior wall (e.g., rear wall, rear surface, etc.), shown as back wall 27, and a peripheral edge or lip, shown as peripheral wall 29, extending around the periphery of the back wall 27. The back wall 27 and the peripheral wall 29 of the first shell 22 and the second shell 24 (*a*) include a first plurality of interfaces (e.g., protrusions, tabs, pins, posts, etc.), shown as male interfaces 28, extending therefrom and (b) define a second plurality of interfaces (e.g., recesses, apertures, slots, cutouts, notches, receivers, etc.), shown as female interfaces 30, therein. According to the exemplary embodiment shown in FIGS. 2, 6, and 7, each of the first shell 22 and the second shell 24 includes both the male interfaces 28 and the female interfaces 30. In some embodiments, one of the first shell 22 or the second shell 24 includes all male interfaces 28 and the other one of the first shell 22 or the second shell 24 includes all female interfaces 30. In some embodiments, the male interfaces 28 include pins or posts extending from the first shell 22 and/or the second shell 24. Additionally or alternatively, in some embodiments, the male interfaces 28 include protrusions positioned along surfaces of the first shell 22 and/or the second shell 24 (e.g., mating surfaces configured to interface when the first shell 22 is coupled with the second shell 24). In some embodiments, the female interfaces 30 include cutouts along surfaces opposing the surfaces along which the male interfaces 28 are positioned (e.g., mating surfaces).

According to an exemplary embodiment, the female interfaces 30 are configured (e.g., shaped, sized, etc.) to engage with and receive the male interface 28 to align the first shell 22 and the second shell 24 and facilitate coupling the first shell 22 and the second shell 24 together. In some embodiments, when the first shell 22 and the second shell 24 are coupled with each other (as shown in FIG. 1), the housing 20 is ultrasonically welded to fixedly secure the first shell 22 and the second shell 24 together (e.g., to bond the male interface 28 within the female interfaces 30), thereby enclosing the housing 20 and the components disposed internal thereto (e.g., the locking mechanism 40, the actuator 60, the induction assembly 80, the internal support 90) within the housing 20. In such embodiments, the first shell 22 and the second shell 24 are integrally formed such that the housing 20 is a unitary body (e.g., as a single monolithic piece that cannot be separated without damaging the first shell 22 or the second shell 24). In some embodiments, the first shell 22 and the second shell 24 are adhesively coupled to one another. In some embodiments, the first shell 22 and the second shell 24 are otherwise coupled to one another.

Figure 9:
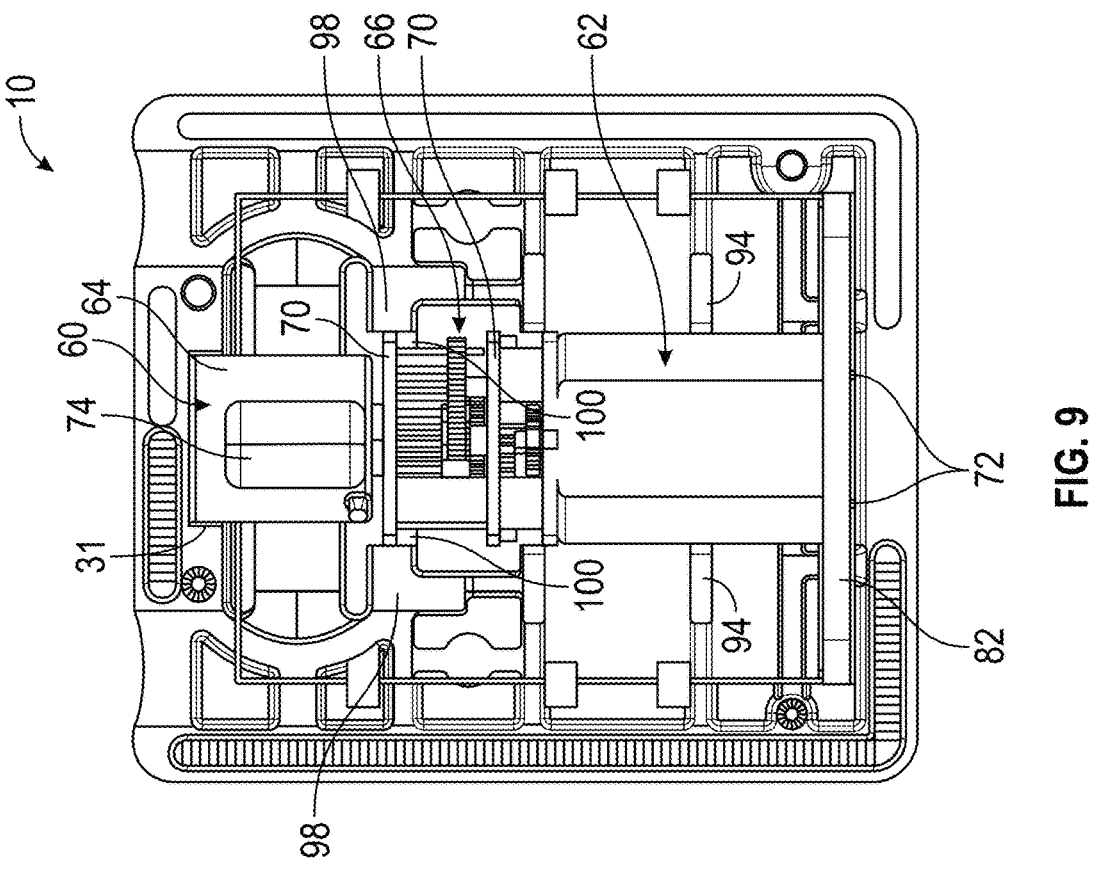
FIG. 9 is an interior view of the induction assembly, the support structure, and the actuation assembly disposed in the first shell of the lock of FIG. 1, according to an exemplary embodiment.

As shown in FIGS. 2 and 6-9, an interior facing surface of an upper wall portion of the peripheral wall 29 of the first shell 22 and the second shell 24 defines an annular cutout, shown as cutout 31. As shown in FIG. 9, the cutout 31 is configured to receive at least a portion of the actuator 60. The cutout 31 may be configured (e.g., sized, shaped, etc.) to permit rotation of the portion of the actuator 60 received within the cutout 31.

As shown in FIGS. 1, 2, and 6-8, the upper wall portions of the peripheral walls 29 of the first shell 22 and the second shell 24 cooperatively define a pair of apertures, shown as openings 32, that extend therethrough, proximate opposing lateral sides thereof. The openings 32 extend from the interior chamber 26 to an exterior environment surrounding the lock 10. The openings 32 are sized to receive at least a portion of the locking mechanism 40 (e.g., the shackle 42). By way of example, at least a portion of the locking mechanism 40 may extend from within the interior chamber 26 to the exterior environment surrounding the lock 10 through the openings 32. In some embodiments, the first shell 22 and the second shell 24 are differently sized such that only one of the first shell 22 and the second shell 24 defines the openings 32.

As shown in FIGS. 2, and 6-8, each of the first shell 22 and the second shell 24 includes a first plurality of support interfaces (e.g., tabs, protrusions, etc.), shown as ribs 34, positioned along interior facing surfaces of the back wall 27 and/or sidewall portions of the peripheral wall 29. By way of example, the ribs 34 may be positioned along opposing interior facing surfaces (e.g., surfaces facing the interior chamber 26) of the first shell 22 and the second shell 24 such that the ribs 34 extend within the interior chamber 26. As shown in FIGS. 2 and 6-8, the ribs 34 are vertically spaced apart from each other to form or define gaps or spaces therebetween. The ribs 34 may be structured to support one or more components or assemblies of the lock 10 (e.g., the locking mechanism 40, the actuator 60, the induction assembly 80, the internal support 90). By way of example, the one or more components or assemblies of the lock 10 may be received within the spaces defined between the ribs 34 and positioned on top of (e.g., along an upward facing surface of the ribs 34) and/or below (e.g., along a downward facing surface of the ribs 34) the ribs 34 to be supported thereby. According to the exemplary embodiment shown in FIG. 2, a portion (e.g., the end portion closest to the central plane extending between the first shell 22 and the second shell 24) of one or more of the ribs 34 is shaped (e.g., angled, curved, etc.) to support and/or accommodate the shape of the locking mechanism 40 (e.g., to permit translation and/or rotation of one or more components of the locking mechanism 40 relative to the ribs 34). In such embodiments (see, e.g., FIGS. 10 and 11), the shape of the ribs 34 substantially corresponds with or matches a curvature of a portion of the locking mechanism 40 (e.g., an outer circumference of the shackle 42).

Figure 10:
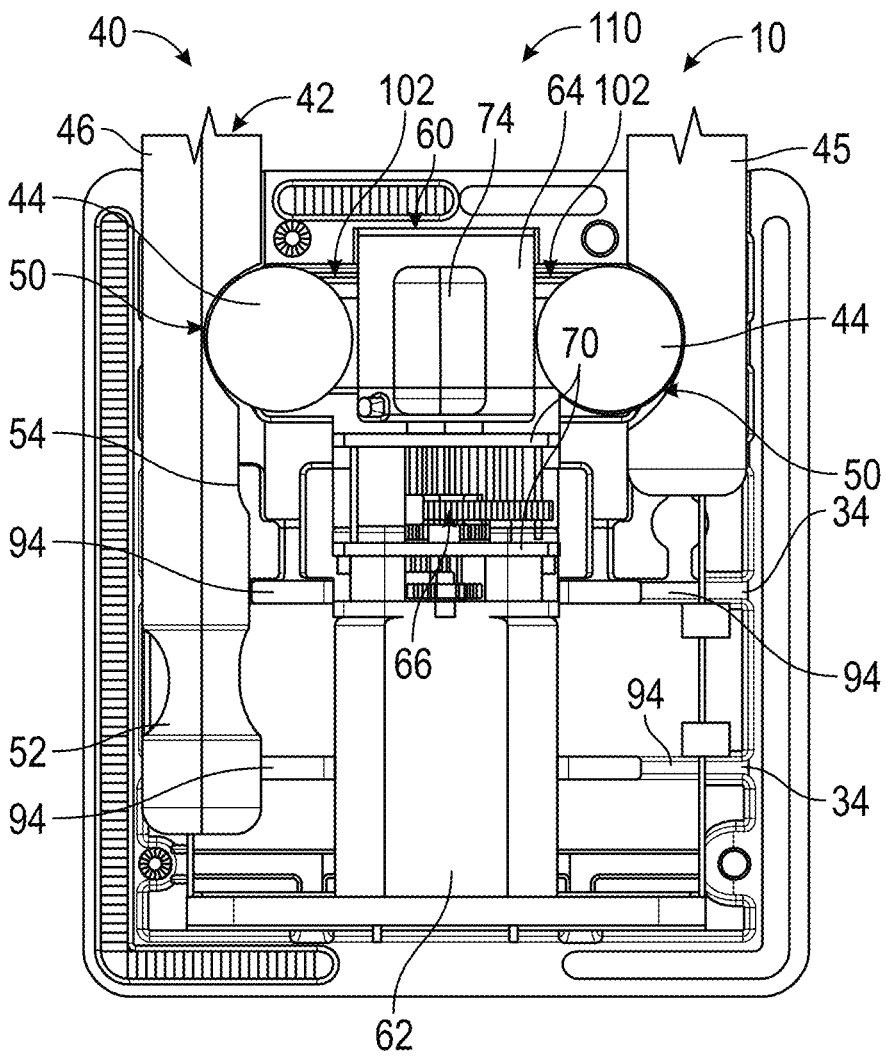
FIG. 10 is an interior view of the induction assembly, the support structure, the actuation assembly, and the locking mechanism disposed in the first shell of the lock of FIG. 1 in a locked state, according to an exemplary embodiment.
Figure 11:
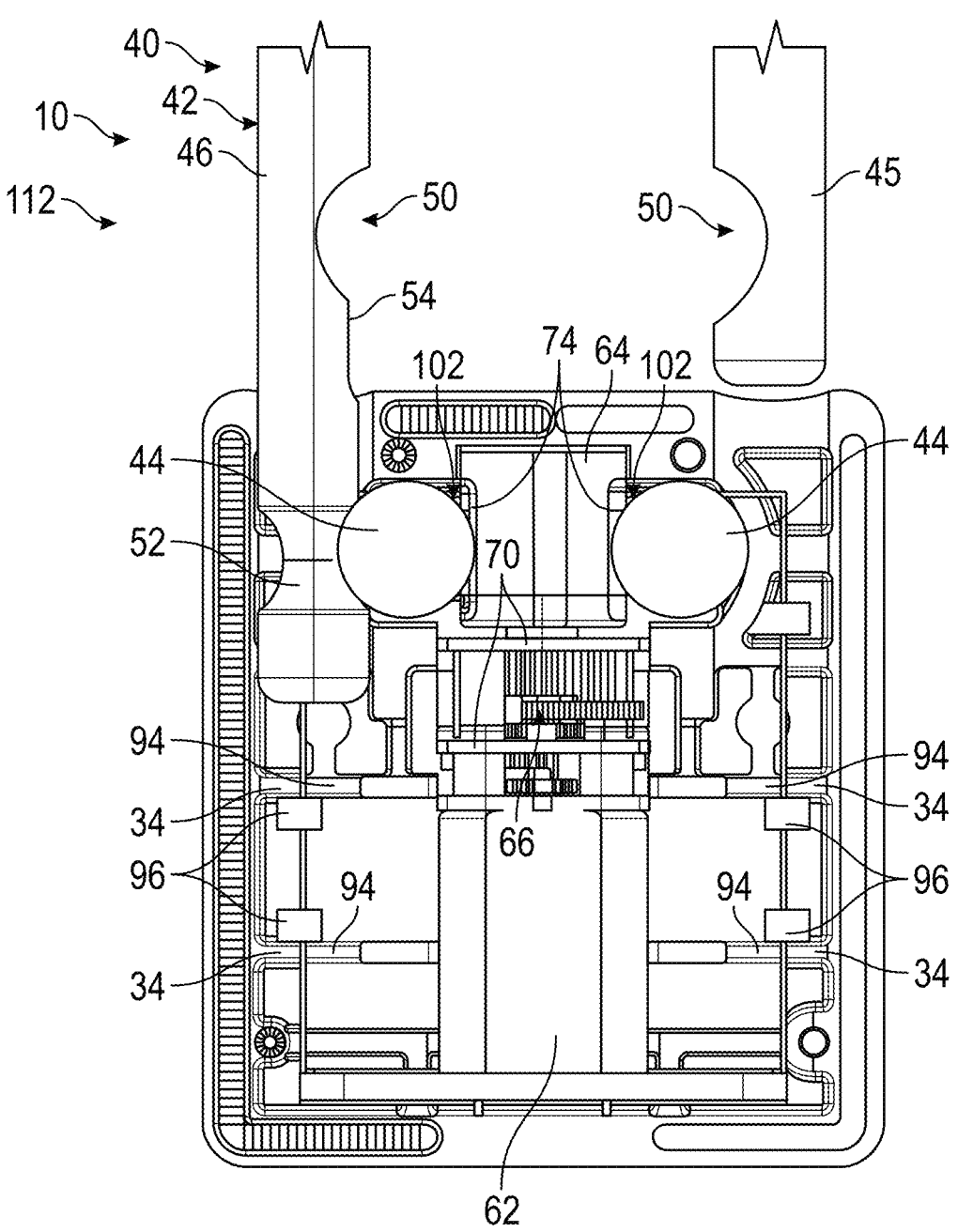
FIG. 11 is an interior view of the induction assembly, the support structure, the actuation assembly, and the locking mechanism disposed in the first shell of the lock of FIG. 1 in an unlocked state, according to an exemplary embodiment.

As shown in FIGS. 1, 2, 10, and 11, the locking mechanism 40 includes a retainer, shown as shackle 42, and at least one bearing (e.g., ball bearing), shown as bearings 44. The shackle 42 is selectively moveable between a first or locked position (as shown in FIGS. 1 and 10) and a second or unlocked position (as shown in FIG. 11). The shackle 42 is configured as a curved rod including a toe portion 45, a heel portion 46 extending parallel to the toe portion 45, and a curved portion 48 connecting the toe portion 45 to the heel portion 46. As shown in FIGS. 2, 10, and 11, a length of the toe portion 45 is less than a length of the heel portion 46. Each of the toe portion 45 and the heel portion 46 of the shackle 42 defines a notched or tapered portion (e.g., a recess, bearing receiving portion, etc.), shown as notch 50, configured to engage with and receive at least a portion of the bearings 44. When the bearing 44 is received within the notch 50, the bearing 44 is configured to inhibit translation of the shackle 42 (e.g., vertical translation of the shackle 42 from the locked position to the unlocked position, when the lock 10 is in the locked state, etc.).

As shown in FIGS. 2, 10, and 11, the shackle 42 includes or defines a shoulder 52 (e.g., an end portion) proximate a lower end of the heel portion 46. The shoulder 52 extends around the circumference of the shackle 42. As shown in FIG. 11, the shoulder 52 is configured to engage with the bearing 44 to limit translation of the shackle 42 (e.g., vertical translation of the shackle 42, when the lock 10 is in the unlocked state) to retain at least a portion of the shackle 42 within the housing 20. When the bearing 44 is engaged with the shoulder 52 (e.g., when the shackle 42 is in the unlocked position), the shackle 42 can rotate about a central axis of the heel portion 46 relative to the housing 20.

As shown in FIGS. 2, 10, and 11, the shackle 42 includes or defines a recessed region or portion, shown as groove 54, extending along the heel portion 46 between the shoulder 52 and the notch 50. The groove 54 is configured to permit translation of the shackle 42 (e.g., vertical translation) between the locked position and the unlocked position (e.g., when the lock 10 is in the unlocked state). The groove 54 is structured to engage with the bearing 44 and retain the bearing 44 as the shackle 42 translates between the locked position and the unlocked position. When the bearing 44 is engaged with the groove 54, rotation of the shackle 42 about the central axis of the heel portion 46 relative to the housing 20 is inhibited.

As shown in FIGS. 9-11, the actuator 60 is disposed within the housing 20. According to an exemplary embodiment, the actuator 60 is configured to facilitate selectively transitioning the lock 10 between a locked state and an unlocked state. As shown in FIGS. 2 and 9-11, the actuator 60 includes a driver, shown as motor 62 (e.g., servo motor, stepper motor, DC motor, AC motor, etc.), and a retainer, shown as actuator head 64. As shown in FIGS. 10 and 11, the motor 62 is configured to generate mechanical power in response to receiving electrical energy (e.g., from the induction assembly 80) to rotate the actuator head 64.

As shown in FIGS. 2 and 9-11, the actuator 60 includes a transmission (e.g., gear box, geartrain, a meshed gear assembly, etc.), shown as gear assembly 66, and an output (e.g., an armature shaft), shown as shaft 68. The gear assembly 66 couples the motor 62 to the shaft 68 and the shaft 68 couples to the actuator head 64. According to an exemplary embodiment, the gear assembly 66 is configured to manipulate or modulate the mechanical power generated by the motor 62 (e.g., a torque thereof, a speed thereof, etc.) and rotate the shaft 68 to drive the actuator head 64. In some embodiments, the actuator 60 does not include the gear assembly 66. In such embodiments, an output of the motor 62 may be directly coupled to the actuator head 64.

As shown in FIGS. 2 and 9-11, the actuator 60 includes one or more supports, shown as support plates 70. According to an exemplary embodiment, the support plates 70 are configured to support the gear assembly 66 such that gears of the gear assembly 66 remain meshed with each other when the motor 62 is installed in the lock 10 and when the lock 10 is being used (e.g., during locking/unlocking operations, during torsional loading, when the lock 10 is transported by a user, or any other standard use of the lock 10).

As shown in FIGS. 2 and 9, the motor 62 includes one or more electrical interfaces (e.g., wires, terminals, electrical energy receivers), shown as leads 72, extending from a bottom surface of the motor 62 and configured to receive electrical energy from an energy supply source (e.g., from the induction assembly 80, a battery, etc.) to power the motor 62. In some embodiments, the leads 72 are otherwise positioned about the motor 62. In some embodiments, the motor 62 includes a sensor, such as a potentiometer or an encoder, configured to acquire position data of the motor 62 to determine whether the motor 62 is in an unlocked state or a locked state.

As shown in FIGS. 2 and 8-11, the actuator head 64 includes or defines notches or recesses, shown as pockets 74, positioned along opposing sides of an outer surface thereof (e.g., a first pocket 74 positioned along a first side of the outer surface of the actuator head 64 and a second pocket 74 positioned along a second side of the outer surface of the actuator head 64 where the first side is opposite the second side). As shown in FIG. 11, the pockets 74 are configured to receive at least a portion of the bearings 44 (e.g., when the lock 10 is in the unlocked state) to permit translation of the shackle 42. The actuator head 64 is operatively coupled with the shaft 68 of the motor 62 such that rotation of the shaft 68 rotates the actuator head 64 between a first, locked configuration (as shown in FIG. 10) and a second, unlocked configuration (as shown in FIG. 11).

Figures 4, 5:
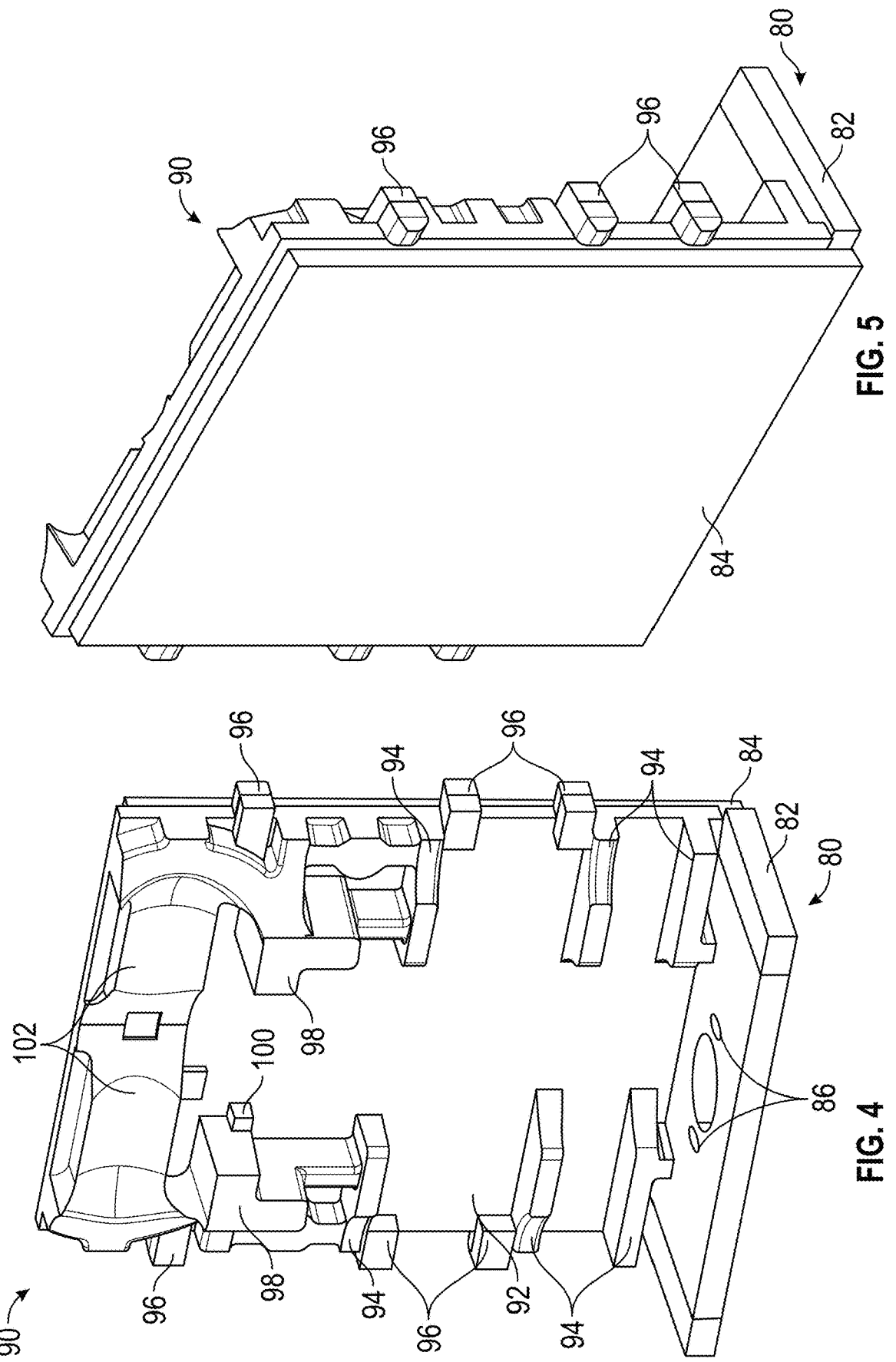
FIG. 4 is a front perspective view of the induction assembly and the support structure of the lock of FIG. 1, according to an exemplary embodiment.
FIG. 5 is a rear perspective view of the induction assembly and the support structure of the lock of FIG. 1, according to an exemplary embodiment.

As shown in FIG. 9, the induction assembly 80 is configured to operatively couple with the actuator 60 to provide power thereto without the use of an active power supply source such as a battery. As shown in FIGS. 2, 4, 5, and 9, the induction assembly 80 includes a printed circuit board assembly ("PCB-A") (e.g., a controller), shown as PCB-A 82, in electrical communication with a passive power source, shown as induction coil 84. As shown in FIGS. 2 and 4, the PCB-A 82 defines a plurality of apertures, shown as apertures 86, extending through the PCB-A 82 to facilitate mechanically and electrically coupling the motor 62 with the PCB-A 82. More specifically, the apertures 86 are sized to receive the leads 72 to mechanically and electrically couple the motor 62 with the PCB-A 82.

As shown in FIGS. 2, 4, and 5, the induction coil 84 extends within a plane that is substantially perpendicular to a plane in which the PCB-A 82 extends. The induction coil 84 is configured to inductively couple with an external inductive coupling power source, such as a user device (e.g., a mobile phone, a tablet, a computer, a smart watch, etc.) or an initiator device (e.g., an electronic key, a key fob, an inductively charged device, a dedicated dongle, etc.), to transfer power to the PCB-A 82 and, in turn, power the motor 62. In some embodiments, the induction coil 84 includes a power transmission circuit configured to transmit power to a power receiving circuit of the PCB-A 82 configured to receive power and transfer the received power to the motor 62 (e.g., via the leads 72). By way of example, the external power device (e.g., user device 400) may be positioned in proximity to the lock 10 to bring the external power device in wireless power communication with the induction coil 84 (e.g., to inductively couple the external power device with the induction coil 84). The external power device may include near-field communication ("NFC") capabilities to enable power transfer between the external power device and the induction coil 84 when the external power device and the induction coil 84 are in wireless power communication range with each other, thereby wirelessly inductively powering the motor 62. The NFC capabilities of the external power device may enable data exchange between the external power device and the PCB-A 82 when the external power device and the induction coil 84 are in wireless power communication with each other.

As shown in FIGS. 8-11, the internal support 90 is configured to be disposed within the first shell 22 of the housing 20 and to support the locking mechanism 40, the actuator 60, and the induction assembly 80. As shown in FIGS. 2-5 and 8-11, the internal support 90 includes a main body, shown as plate 92, having a plurality of support interfaces. The support interfaces are configured to engage with (a) one or more components or surfaces of the locking mechanism 40, the actuator 60, and the induction assembly 80 to provide support thereto and (b) the first shell 22. The plurality of support interfaces of internal support 90 include a first plurality of support interfaces (e.g., protrusions, tabs, etc.) shown as ribs 94, configured to extend within the interior chamber 26 when the internal support 90 is arranged within the housing 20. As shown in FIG. 2, a first end of one or more of the ribs 94 positioned closest to the edge of the plate 92 is shaped (e.g., angled, curved, etc.) to support and/or accommodate the shape of the locking mechanism 40 (e.g., to permit translation and/or rotation of one or more components of the locking mechanism 40 relative to the ribs 34). In such embodiments (see, e.g., FIGS. 10 and 11), the shape of the ribs 94 substantially corresponds with or matches a curvature of a portion of the locking mechanism 40 (e.g., an outer circumference of the shackle 42). As shown in FIGS. 8-11, the ribs 94 are positioned to align with the ribs 34 of the first shell 22 and the second shell 24 such that the ribs 34 and the ribs 94 cooperatively support the locking mechanism 40 (e.g., the shackle 42). As shown in FIGS. 2 and 9-11, an opposing second end of one or more of the ribs 94 positioned closest to the center of the plate 92 is shaped (e.g., angled, curved, etc.) to support and/or accommodate the shape of the actuator 60 (e.g., to inhibit lateral translation thereof).

As shown in FIGS. 2-5 and 8, the plurality of support interfaces of internal support 90 include a second plurality of support interfaces (e.g., protrusions, tabs, etc.), shown as rib supports 96, extending from the ribs 94 and/or the plate 92. The rib supports 96 are configured to be received within the spaces defined between the ribs 34 and engage with a top or bottom surface of the ribs 34 to facilitate alignment of the ribs 94 with the ribs 34. Similarly, the rib supports 96 are configured engage with the top or bottom surface of the ribs 34 to inhibit translation of the internal support 90 within the housing 20.

As shown in FIGS. 2-4, 8, and 9, the plurality of support interfaces of internal support 90 include a third plurality of support interfaces (e.g., protrusions, tabs, etc.) shown as lateral supports 98, extending from the plate 92 and configured to extend within the interior chamber 26 when the internal support 90 is disposed within the housing 20. The lateral supports 98 are laterally spaced apart from each other to define a space sized to receive at least a portion of the actuator 60. As shown in FIG. 9, the lateral supports 98 are configured to engage with the support plates 70 of the gear assembly 66 to inhibit lateral and vertical translation of the actuator 60 within the housing 20. As shown in FIGS. 2-4, 8, and 9, the plurality of protrusions of internal support 90 include a fourth plurality of support interfaces (e.g., protrusions, tabs, support plate supports, etc.), shown protrusions 100, extending laterally inward from the lateral supports 98. As shown in FIG. 9, the protrusions 100 are configured to engage with a surface (e.g., a bottom surface) of at least one of the support plates 70 (e.g., an upper support plate) of the gear assembly 66 to inhibit vertical translation of the actuator 60 within the housing 20.

As shown in FIG. 7, the second shell 24 includes a second plurality of support interfaces (e.g., protrusions, tabs, etc.), shown as lateral supports 104, laterally spaced apart from each other to define a space sized to receive at least a portion of the actuator 60. In some embodiments, the lateral supports 98 of the internal support 90 and the lateral supports 104 of the second shell 24 collectively define the space to receive the actuator 60. According to an exemplary embodiment, the lateral supports 104 are configured to engage with the one or more or the support plates 70 of the gear assembly 66 to inhibit lateral translation of the actuator 60 within the housing 20. As shown in FIG. 7, a second plurality of support interfaces (e.g., protrusions, tabs, support plate supports, etc.), shown protrusions 105, extending laterally inward from the lateral supports 104. According to an exemplary embodiment, the protrusions 105 are configured to engage with a surface (e.g., a bottom surface) of at least one of the support plates 70 (e.g., an upper support plate) of the gear assembly 66 to inhibit vertical translation of the actuator 60 within the housing 20 (e.g., similar to the protrusions 100).

As shown in FIGS. 2-4, 8, 10, and 11, the internal support 90 includes or defines a pair of recesses (e.g., spherical recesses), shown as pockets 102, positioned proximate an upper edge of the internal support 90. As shown in FIG. 11, the pockets 102 are configured to receive at least a portion of the bearings 44. The pockets 102 extend laterally inwards and are structured to permit lateral translation of the bearings 44 (e.g., when the lock 10 is in the unlocked state and the shackle 42 is translated from the locked position to the unlocked position).

As shown in FIG. 7, the second shell 24 includes or defines a pair of recesses (e.g., spherical recesses), shown as pockets 106, extending from the back wall 27 proximate an upper edge of the second shell 24. According to an exemplary embodiment, the pockets 106 are configured to receive at least a portion of the bearings 44 (e.g., similar to the pockets 102). According to an exemplary embodiment, the pockets 106 extend laterally inwards and are structured to permit lateral translation of the bearings 44 (e.g., when the lock 10 is in the unlocked state and the shackle 42 is translated from the locked position to the unlocked position, similar to the pockets 102, etc.). According to an exemplary embodiment, the pockets 102 and the pockets 106 align and cooperatively receive the bearings 44.

As shown in FIGS. 4 and 5, the induction assembly 80 is coupled with the internal support 90. The induction coil 84 extends along and interfaces with a rearward facing surface of the plate 92 of the internal support 90. The internal support 90 is positioned above the PCB-A 82 such that a bottom surface of the internal support 90 contacts a top surface of the PCB-A 82. The PCB-A 82 extends within a plane that is substantially perpendicular to a plane in which the plate 92 of the internal support 90 extends. According to an exemplary embodiment, when the induction assembly 80 and the internal support 90 are disposed within the interior chamber 26 of the housing 20, the induction coil 84 is sandwiched between the plate 92 and the back wall 27 of the first shell 22. In some embodiments, the induction assembly 80 includes two inductions coils 84, one positioned along the back wall 27 of each of the first shell 22 and the second shell 24.

Figure 8:
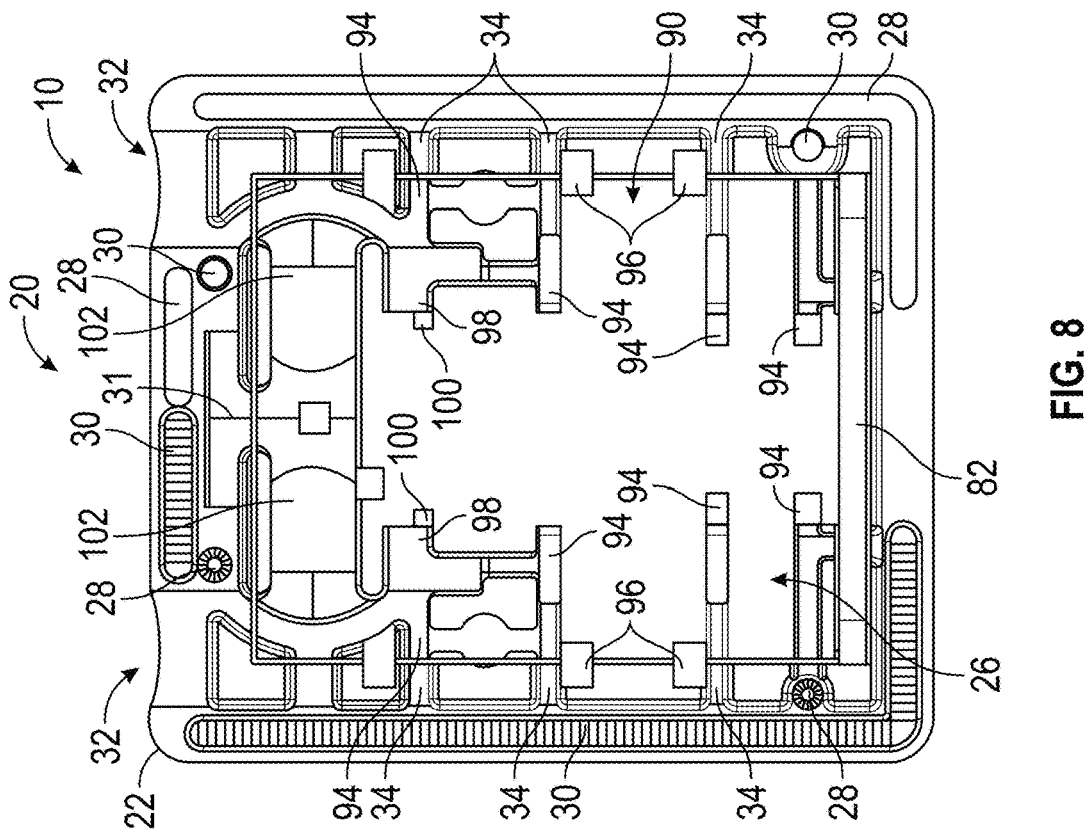
FIG. 8 is an interior view of the induction assembly and the support structure disposed in the first shell of the lock of FIG. 1, according to an exemplary embodiment.

Referring to FIGS. 6-10, a method for assembling the lock 10 is shown, according to an exemplary embodiment. As shown in FIGS. 6 and 7, the first shell 22 and the second shell 24 of the housing 20 are provided. As shown in FIG. 8, the induction assembly 80 coupled with the internal support 90 is disposed within the first shell 22. The induction assembly 80 is arranged within the first shell 22 such that the induction coil 84 is positioned within the interior chamber 26 between the internal support 90 and the back wall 27 of the first shell 22. In some embodiments, the induction assembly 80 includes a second induction coil 84 configured to be positioned within the interior chamber 26 between the second shell 24 and the internal support 90. As shown in FIG. 8, the rib supports 96 are received within the spaces defined between the ribs 34 of the first shell 22 and each rib support 96 engages with either a top surface or a bottom surface of a respective one of the ribs 34 to facilitate alignment of the ribs 94 of the internal support 90 with the ribs 34 of the first shell 22. The engagement of the rib supports 96 with the ribs 34 inhibit vertical translation of the induction assembly 80 and the internal support 90 within the interior chamber 26 of the housing 20.

As shown in FIG. 9, the actuator 60 is mechanically and electrically coupled with the PCB-A 82 of the induction assembly 80. The leads 72 are received within the apertures 86 extending through the PCB-A 82 to facilitate mechanically coupling the motor 62 with the PCB-A 82. In some embodiments, at least a portion of the leads 72 extend entirely through the PCB-A 82. In some embodiments, the leads 72 are barbed to engage with an interior surface of the PCB-A 82 defining the apertures 86 such that the leads 72 are fixedly secured within the apertures 86. Additionally or alternatively, the leads 72 may be soldered to the PCB-A 82 or within the apertures 86 of the PCB-A 82 to mechanically couple the motor 62 with the PCB-A 82. When the leads 72 are mechanically coupled to the PCB-A 82, the leads 72 conductively contact the power receiving circuit of the PCB-A 82 to electrically couple the motor 62 with the PCB-A 82.

As shown in FIG. 9, the actuator 60 extends from the PCB-A 82 in a vertical direction within the interior chamber 26 such that at least a portion of the actuator head 64 of the actuator 60 is received within the cutout 31. The cutout 31 is shaped to permit rotation of the actuator head 64 between a locked configuration and an unlocked configuration. The ribs 94 of the internal support 90 extend towards the actuator 60 to engage and support the motor 62 of the actuator 60. The engagement between the ribs 94 and the actuator 60 inhibit lateral translation of motor 62 and facilitate proper positioning and alignment of the actuator 60 within the interior chamber 26.

As shown in FIG. 9, when the actuator 60 is arranged within the interior chamber 26, the lateral supports 98 of the internal support 90 (and the lateral supports 104 of the second shell 24 when coupled with the first shell 22) engage with lateral sides of one or more of the support plates 70. The engagement between (a) the lateral supports 98 and the lateral supports 104 and (b) the support plates 70 lateral inhibit translation of the gear assembly 66 of the actuator 60 and facilitate proper positioning and alignment of the actuator 60 within the interior chamber 26. In such a configuration, the protrusions 100 (and the protrusions 105 of the second shell 24 when coupled with the first shell 22) engage with a bottom surface of an upper support plate of the support plates 70 to inhibit vertical translation of the actuator 60 within the housing 20. In some embodiments, the internal support 90 and the second shell 24 include more or fewer than two protrusions 100 and protrusions 105, respectively, to support one or more different support plates 70.

As shown in FIG. 10, a portion of the locking mechanism 40 is disposed within the interior chamber 26 and supported by the internal support 90. More specifically, a portion of the heel portion 46 of the shackle 42 is supported by the ribs 34 of the first shell 22 and by the ribs 94 of the internal support 90 where the heel portion 46 is received within the aligned shaped or curved portions of the ribs 34 and the ribs 94. Similarly, the toe portion 45 of the shackle 42 is supported by and received within the aligned shaped or curved portions of the ribs 34 and the ribs 94 along the opposing edge of the first shell 22 and the internal support 90, respectively. The toe portion 45 and the heel portion 46 extend from the interior chamber 26 outside of the housing 20 (e.g., through the openings 32 when the first shell 22 and the second shell 24 are coupled with each other). Outside of the housing 20, the curved portion 48 connects the toe portion 45 and the heel portion 46 with each other.

As shown in FIG. 10, the lock 10 is in a first state, shown as locked state 110. In the locked state 110, (a) the bearings 44 are positioned (i) at least partially within the pockets 102 of the internal support 90 (and within the pockets 106 of the second shell 24 when coupled with the first shell 22) and (ii) at least partially within the notch 50 of the toe portion 45 and the heel portion 46, respectively, and (b) the actuator head 64 is positioned such that the pockets 74 are not in alignment with the bearings 44. In the locked state 110, translation of the bearings 44 in a lateral direction within the pockets 102 is inhibited by the actuator head 64, thereby inhibiting vertical translation of the shackle 42 (e.g., such that the toe portion 45 is retained within the housing 20). By way of example, if an upward force is applied to the shackle 42 (e.g., by a user attempting to translate the shackle 42) when the lock 10 is in the locked state 110, the notch 50 of the toe portion 45 and the heel portion 46 may bias the bearing 44 laterally inwards (e.g., in a direction towards the actuator head 64) such that the bearings 44 contact an outer surface of the actuator head 64 (e.g., a portion of the outer surface of the actuator head 64 not defining the pockets 74) and are inhibited from translating within the pockets 102 (and the pockets 106 of the second shell 24 when coupled with the first shell 22).

After the locking mechanism 40 is inserted into the first shell 22 and supported by the internal support 90, the second shell 24 may be coupled with the first shell 22 (e.g., by engaging the male interfaces 28 within the female interfaces 30). When the first shell 22 and the second shell 24 are coupled with each other, the housing 20 may be ultrasonically welded to fixedly secure the first shell 22 and the second shell 24 together, thereby enclosing the various components of the lock 10 received within the interior chamber 26 described above inside the housing 20. In such embodiments, the first shell 22 and the second shell 24 are integrally formed such that the housing 20 is a unitary body (e.g., as a single monolithic piece that cannot be separated without damaging the first shell 22 or the second shell 24).

As shown in FIG. 11, the lock 10 is in a second state, shown as unlocked state 112. In the unlocked state 112, the shackle 42 is free to vertically translate relative to the housing 20 such that the toe portion 45 can be removed from the interior chamber 26. When the lock 10 is in the unlocked state 112 and the toe portion 45 is not disposed within the housing 20, the shackle 42 may freely rotate about the central axis of the heel portion 46 relative to the housing 20.

The lock 10 is configured to transition from the locked state 110 to the unlocked state 112 in response to receiving an actuation signal. By way of example, the external power device (e.g., user device 400) may be positioned in proximity to the lock 10 to bring the induction coil 84 in wireless power communication with the external power device (e.g., to inductively couple the external power device with the induction coil 84). When the external power device and the induction coil 84 are inductively coupled, the NFC capabilities of the external power device enable power transfer between the external power device and the induction coil 84, thereby wirelessly powering the motor 62. The external power device may transmit a signal associated with an actuation command to power the motor 62 to rotate the shaft 68 and, in turn, the actuator head 64. In response to receiving the actuation signal, the motor 62 may rotate the actuator head 64 between the locked configuration (e.g., as shown in FIG. 10) and the unlocked configuration (as shown in FIG. 11) to transition the lock 10 between the locked state 110 and the unlocked state 112.

When the actuator head 64 is rotated to the unlocked configuration, the pockets 74 of the actuator head 64 face laterally outward (e.g., in a direction towards the bearings 44) such that the pockets 74 align with the bearings 44 and can receive at least a portion of the bearings 44. In such a configuration (e.g., when the lock 10 is in the unlocked state 112), translation of the bearings 44 within the pockets 102 and the pockets 106 is permitted. By way of example, if an upward force is applied to the shackle 42 (e.g., by a user attempting to translate the shackle 42) when the lock 10 is in the unlocked state 112, the notch 50 of the toe portion 45 and the heel portion 46 may bias the bearing 44 laterally inwards (e.g., in a direction towards the actuator head 64) such that the bearings 44 translate laterally inwards and are received within the pockets 74 of the actuator head 64. In such an example, the shackle 42 is permitted to translate vertically. As the shackle 42 is translated vertically between the locked position (e.g., as shown in FIG. 10) and the unlocked position (e.g., as shown in FIG. 11), one of the bearings 44 is received within the groove 54 of the heel portion 46. As shown in FIG. 11, in the unlocked position, the shoulder 52 of the shackle 42 engages with the bearing 44 to retain at least a portion of the shackle 42 (e.g., at least a portion of the heel portion 46) within the housing 20. When the bearing 44 is engaged with the shoulder 52 (e.g., when the shackle 42 is in the unlocked position), the shackle 42 can rotate about the central axis of the heel portion 46 relative to the housing 20.

Figure 12:
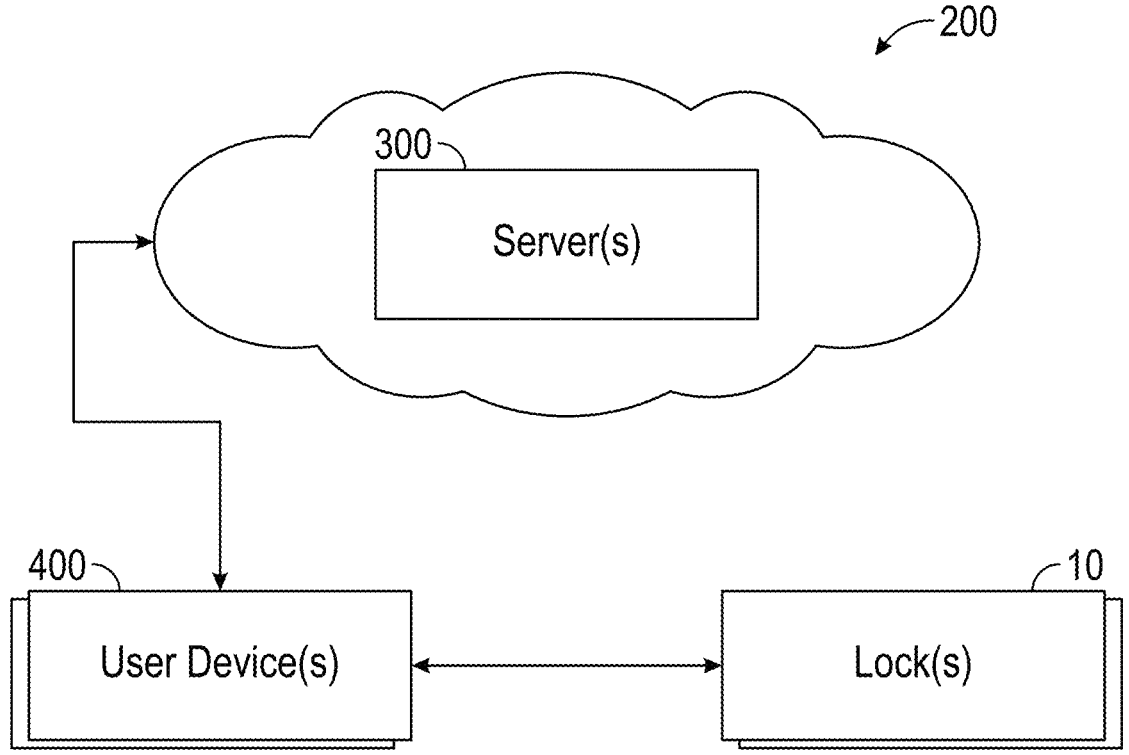
FIG. 12 is a block diagram of a lock system for wireless communication (a) between one or more servers and one or more user devices and (b) between the one or more user devices and one or more locks of FIG. 1, according to an exemplary embodiment.
Figure 14:
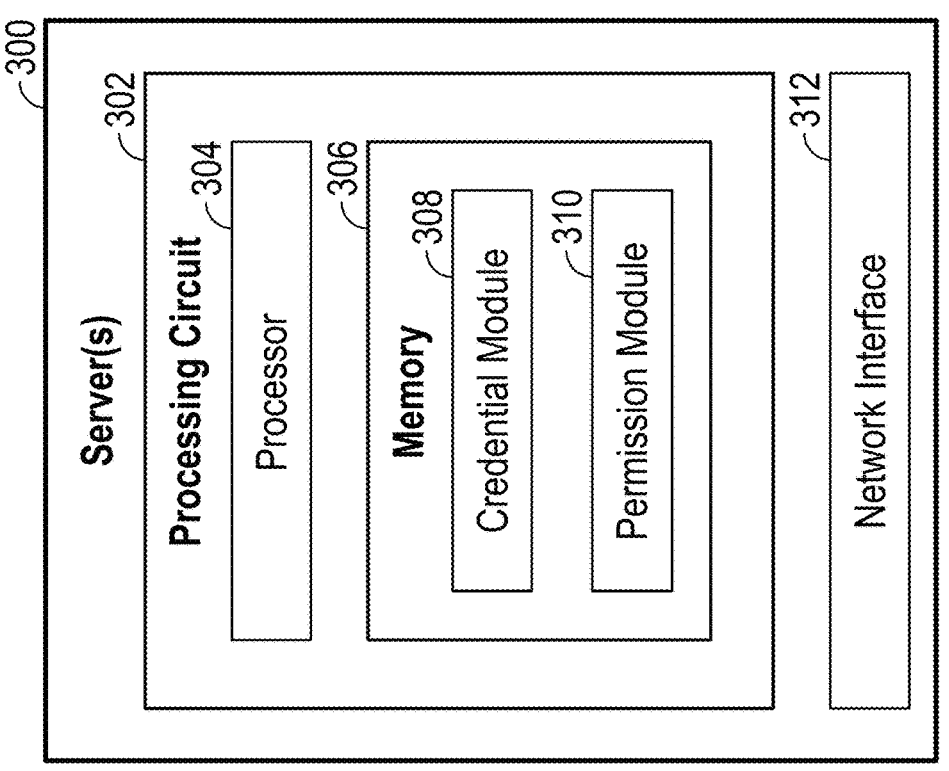
FIG. 14 is a block diagram of the one or more servers of FIG. 12, according to an exemplary embodiment.
Figure 13:
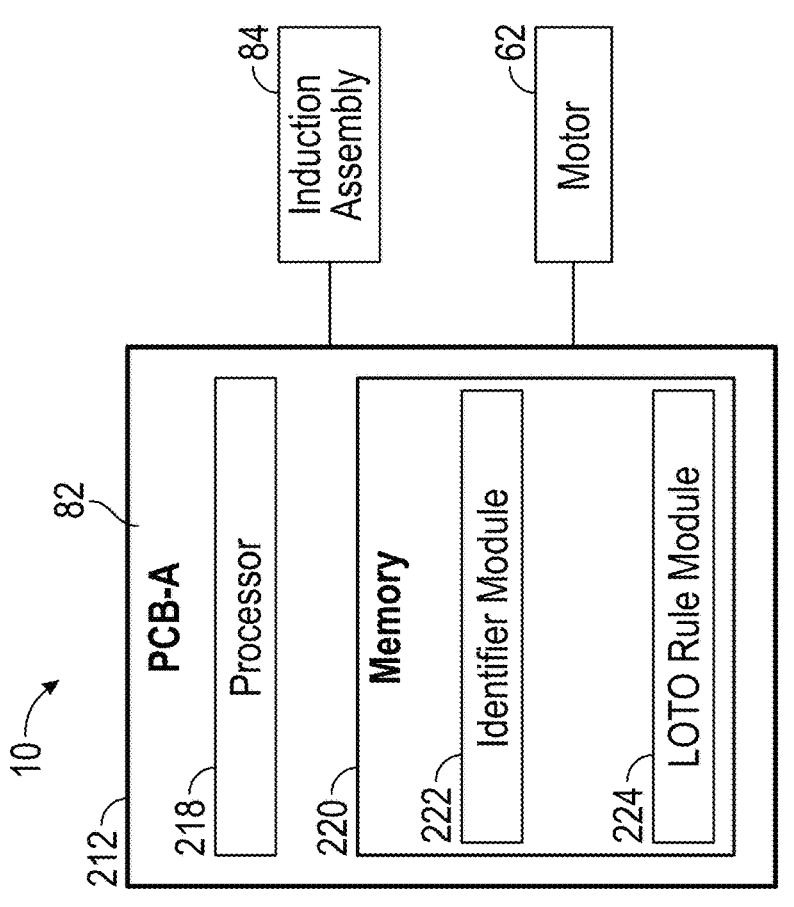
FIG. 13 is a block diagram of the one or more locks of FIG. 12, according to an exemplary embodiment.

According to an exemplary embodiment shown in FIGS. 12-14, a lockout-tagout ("LOTO") management system, shown as lock system 200, includes one or more locks 10, one or more remote severs (e.g., a credential management server, a profile management server, etc.), shown as server(s) 300, and one or more portable devices (e.g., a smartphone, a mobile phone, a cell phone, a tablet, a laptop, a smartwatch, a smartcard, a keycard, a key dongle, etc.), shown as user device(s) 400.

As shown in FIG. 12, the server 300 is configured to communicate with the user device 400 (e.g., using a first communication protocol, using a long-range communication protocol, cellular, Wi-Fi, radio, etc.) and the user device 400 is configured to communicate with the lock 10 (e.g., using a second communication protocol, using a short-range communication protocol, Bluetooth, Bluetooth low energy ("BLE"), near-field communication ("NFC"), radio frequency identification ("RFID"), etc.). The user device 400 may thereby function as an intermediary device that facilitates data transmissions between the server 300 and the lock 10. In some embodiments, the server 300 is or includes a plurality of severs. In some embodiments, the server 300 communicates with a plurality of user devices 400. In some embodiments, the user device 400 communicates with a plurality of locks 10. In some embodiments, a plurality of user devices 400 communicate with the lock 10.

As shown in FIG. 13, the PCB-A 82 of the lock 10 includes a processor 218 and a memory 220. The processor 218 may include a general-purpose processor, an ASIC, one or more FPGAs, a DSP, circuits containing one or more processing components, circuitry for supporting a microprocessor, a group of processing components, or other suitable electronic processing components. In some embodiments, the processor 218 is configured to execute computer code stored in the memory 220 to facilitate the activities described herein. The memory 220 may be any volatile or non-volatile computer-readable storage medium capable of storing data or computer code relating to the activities described herein. According to an exemplary embodiment, the memory 220 includes computer code modules (e.g., executable code, object code, source code, script code, machine code, etc.) configured for execution by the processor 218.

According to an exemplary embodiment, the induction coil 84 is configured to facilitate short-range communications between the lock 10 and the user devices 400. In some embodiments, the induction coil 84 facilitates powering a communication device of the PCB-A 82 with short-range wireless communication capabilities (e.g., radiofrequency, RFID, Wi-Fi, Bluetooth, a Bluetooth Low Energy ("BLE") chip, ZigBee, NFC, etc.) to transmit data between the PCB-A 82 and a transceiver of the user devices 400 or another nearby communication device (e.g., a router, etc.). In some embodiments, the induction coil 84 itself provides the wireless communications capabilities to facilitate transmitting data between (a) the induction coil 84 and the transceiver of the user devices 400 and (b) the induction coil 84 and the PCB-A 82. In some embodiments, the induction coil 84 facilitates powering a communication device of the PCB-A 82 with long-range wireless communication capabilities (e.g., a cellular chip, etc.) to transmit data between the PCB-A 82 and the server 300 directly.

According to an exemplary embodiment, the induction coil 84 is configured to facilitate power transfer between the lock 10 and the user devices 400 using a power transfer protocol. By way of example, the power transfer protocol may be a short-range wireless induction power transfer protocol. In some embodiments, the induction coil 84 facilitates a wireless induction power transfer protocol (e.g., inductive coupling, resonant inductive coupling, etc.) to transfer power from the user devices 400 to the PCB-A 82 which, in turn, can provide the power to the motor 62 to facilitate operation thereof (e.g., locking, unlocking, etc.).

According to an exemplary embodiment, the memory 220 of the lock 10 includes an identifier module 222 and a LOTO rule module 224. The identifier module 222 is configured to store a lock identifier, a lock key, and/or a manual access code for the lock 10. The lock identifier may uniquely identify the lock 10 from any other lock 10. In some embodiments, the lock identifier is provided to the lock 10 at the time of manufacturing. The identifier module 222 may be configured to broadcast the lock identifier via the induction coil 84 or the communication device of the PCB-A 82 (e.g., in response to being inductively coupled with the user device 400, etc.) to the user device 400.

The LOTO rule module 224 may receive and store LOTO procedure steps and/or other LOTO procedure information. The LOTO procedure information may be received by the PCB-A 82 from the user device 400 (e.g., in response to being inductively coupled with the user device 400, etc.). In some embodiments, the LOTO information is provided to the LOTO rule module 224 at the time of manufacturing. In some embodiments, the LOTO rule module 224 is configured to store information associated with the current state of the lock 10, such as a locked state or an unlocked state (e.g., based on sensor data received from one or more sensors of the lock 10 configured to acquire position data of the motor 62 indicative of the state of the lock 10).

As shown in FIG. 14, the server 300 includes a processing circuit 302 and a network interface 312. The processing circuit 302 has a processor 304 and a memory 306. The processing circuit 302 may include a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. In some embodiments, the processor 304 is configured to execute computer code stored in the memory 306 to facilitate the activities described herein. The memory 306 may be any volatile or non-volatile computer-readable storage medium capable of storing data or computer code relating to the activities described herein. According to an exemplary embodiment, the memory 306 includes computer code modules (e.g., executable code, object code, source code, script code, machine code, etc.) configured for execution by the processor 304.

According to an exemplary embodiment, the network interface 312 is configured to facilitate wireless communication from and to the server 300 (i) directly to and from the user devices 400 and (ii) indirectly to and from at least one of the locks 10 through the user devices 400. The server 300 may communicate with the user devices 400 directly or via an intermediate network (e.g., an internet network, a cellular network, etc.). For example, the network interface 312 may include physical network components (e.g., a network card, etc.) configured to allow the server 300 to establish a connection to the user devices 400. In one embodiment, communications from the network interface 312 are routed through a cellular interface, allowing the server 300 to communicate with the user devices 400 via a cellular network. In one embodiment, the network interface 312 allows the server 300 to establish an Internet-based connection with the user devices 400. The server 300 may be one server (a physical or virtual server) or may include multiple servers.

According to an exemplary embodiment, the server 300 is configured to manage a plurality of access credentials or user profiles for a plurality of users that have access to at least one of the locks 10. In some embodiments, the memory 306 of the server 300 includes various modules configured to (i) generate and securely store lock identifiers, user identifiers, and user profiles and (ii) selectively provide control commands (e.g., authorization signals associated with a command to actuate the motor 62) to the user devices 400 and the locks 10 based on the permissions of the users (e.g., clearance/authorization level, time schedule, etc.) of the user devices 400 and/or other possible factors.

As shown in FIG. 14, the memory 306 of the server 300 includes a credential module 308 and a permission module 310. The credential module 308 is configured to generate and securely store the lock identifiers (e.g., which may be provided to the locks 10 at the time of manufacturing, etc.). As an example, the credential module 308 may include a first database of lock identifiers and may include the software configured to store and retrieve such lock identifiers from the first database. The credential module 308 may be further configured to facilitate updating, replacing, and/or deleting the lock identifiers (e.g., if a respective lock identifier on a respective lock 10 is compromised, etc.).

The credential module 308 may be further configured to generate and securely store the user identifiers (e.g., when a user is registered to a respective lock 10, etc.). As an example, the credential module 308 may include a second database of user identifiers and may include the software configured to store and retrieve such user identifiers from the second database. The credential module 308 may be further configured to facilitate updating, replacing, and/or deleting the user identifiers (e.g., if a user's access is revoked, if a user identifier expires, etc.), which may be updated in the associated user profiles as necessary.

The credential module 308 may be further configured to generate and securely store the user profiles. As an example, the credential module 308 may include a third database of user profiles and may include the software configured to store and retrieve such user profiles from the third database. The credential module 308 may be further configured to facilitate updating, replacing, and/or deleting the user profiles (e.g., if a user's access is revoked, if a user identifier is updated, etc.). By way of example, the credential module 308 may be configured to generate a user profile for a specific user and/or lock 10 when a new user is added to a respective lock 10. The user profiles may be associated with a user identifier associated with a specific user who has access to one or more locks 10. Each lock 10 accessible by the particular user is associated with a particular lock identifier, each of which may be included in the user profile. The user profiles may include audit data relating to operation of the one or more locks 10 that the user associated with the user profile is permitted to access (e.g., lock and unlock). By way of example, the audit data may include a timestamp (e.g., time, date, etc.) of when a particular lock 10 was locked or unlocked, a location (e.g., based on GPS data collected from the user device 400) of where a particular lock 10 was locked or unlocked, who (e.g., which user, which user identifier, etc.) locked or unlocked a particular lock 10, a state (e.g., locked state or unlocked state) of a particular lock 10 that the user associated with the user profile is permitted to access.

The permission module 310 is configured to receive and store access permissions (e.g., access credentials) for users associated with one or more of the locks 10. The access permissions may include an authorization or clearance level of the user (e.g., administrator clearance, limited clearance, etc.) that defines which of the locks 10 the respective user is able to access and/or limit their access thereto. By way of example, a first user may only unlock or lock a respective lock 10 but not change the settings thereof, while a second user may unlock or lock the respective lock 10 and change the settings thereof. In some embodiments, a respective lock 10 accessible by a first user may be accessible by a second user in response to an authorization granted to the second user by the first user to access the respective lock 10. In such embodiments, one-time authorization permissions that allow the second user to unlock the respective lock 10 are stored on the permission module 310. The access permissions may also include an access schedule that limits the times a user may access a respective lock 10. The permission module 310 may be configured to facilitate updating the user profiles to include the lock identifiers associated with the respective locks 10 that the user (e.g., the user identifier) is authorized to access based on the access permissions stored on the permission module 310.

In some embodiments, an authorized user (e.g., a manager, a supervisor, etc.) may have access to the access permissions stored on the permission module 310. In such embodiments, the authorized user can view, update, delete, or otherwise modify the access permissions data of each user profile and the audit data of each user profile (e.g., the location of where a lock 10 was accessed (or an attempt to access) and by whom, and the time/date of when a lock 10 was accessed (or an attempt to access) and by whom). In some embodiments, in response to the authorized user inductively coupling the user device 400 with the lock 10, the authorized user can view, update, delete, or otherwise modify the access permissions data of each user profile and the audit data of each user profile associated with that particular lock 10.

When attempting to access a lock 10 (e.g., transition the lock 10 between the locked state and the unlocked state), a user may bring the user device 400 in proximity to the lock 10 to bring the induction coil 84 in wireless power communication with the user device 400 (e.g., to inductively couple the user device 400 with the induction coil 84). When the user device 400 and the induction coil 84 are inductively coupled, the communication protocol may be initiated between the lock 10 and the user device 400 to transmit data between the PCB-A 82 and the transceiver of the user device 400. In response to inductively coupling with the lock 10, the user device 400 may receive the lock identifier from the lock 10 (e.g., the lock identifier stored in the identifier module 222 of the memory 220 and uniquely associated with the particular lock 10 inductively coupled with the user device 400). In some embodiments, the lock 10 transmits a signal associated with the state of the lock 10 (e.g., locked state or unlocked state) based on sensor data received from one or more sensors of the lock 10 configured to acquire position data of the motor 62. The user device 400 may transmit a signal associated with the lock identifier and the state of the lock 10 to the server 300. Additionally, the user device 400 may transmit a signal associated with (i) the user identifier uniquely associated with the particular user (e.g., a particular user profile, a particular user device 400, etc.), (ii) a location (e.g., based on GPS data acquired from a location sensor of the user device 400) of the attempt to access the lock 10, and (iii) a time/date of the attempt to access the lock 10 to the server 300.

In response to receiving the signal from the user device 400, the database of user profiles stored on the credential module 308 may be queried through to match a user identifier of one of the user profiles with the user identifier received from the user device 400. If a match is found, the credential module 308 may update the matched user profile with the audit data received from the user device 400 (e.g., update the user profile with the location and time/date of the attempt, update the user profile with the state of the lock 10, etc.).

In response to receiving the signal from the user device 400, the access permissions of the permission module 310 may be queried through to determine whether the user has the authorization to access the lock 10. By way of example, the access permissions may be queried through to match the received lock identifier with a list of lock identifiers associated with locks 10 that the received user identifier is authorized to access. If a match is found, a determination is made that the user device 400 is authorized to access (e.g., lock/unlock) the lock 10. If no match is found, a determination is made that the user device 400 is unauthorized to access the lock 10.

In response to a determination that the user device 400 is authorized or unauthorized to access the lock 10, the server 300 may generate a command signal and transmit the command signal to the user device 400. The user device 400 may transmit the command signal to the LOTO rule module 224 of lock 10 according to the communication protocol (e.g., when the user device 400 and the induction coil 84 are inductively coupled). If the command signal is associated with a determination that the user device 400 is authorized to access the lock 10, the processor 218 of the PCB-A 82 may execute the LOTO procedure steps stored on the LOTO rule module 224. The LOTO procedure steps may include transmitting an actuation signal to the motor 62 to actuate the motor 62, thereby transitioning the lock 10 from the locked state to the unlocked state (e.g., or from the unlocked state to the locked state). If the command signal is associated with a determination that the user device 400 is unauthorized to access the lock 10, the LOTO procedure steps are not executed and the lock 10 does not transition between the locked and unlocked states.

It should be understood that the authentication scheme described herein is not meant to be limiting, but is provided as an example of one possible way to provide secure communication between the lock 10, the server 300, and the user devices 400 of the lock system 200. In other embodiments, secure communication is otherwise established using a different authentication scheme such as an authentication scheme that employs digital signatures, challenge-response procedures, multi-factor authentication (e.g., two-factor authentication, user profile plus a biometric, a user profile plus a PIN, etc.), and/or still other suitable authentication schemes.

According to an exemplary embodiment, the locks 10 and the lock system 200 of the present disclosure provides various advantages relative to currently available locks (e.g., locks used in lockout-tagout systems). Traditionally, locks, such as those used in LOTO systems, include hardware components capable of wirelessly communicably coupling the lock with a server to exchange data. The data exchanged between the lock and the server may include data associated with a unique identifier of the lock, who has access to the lock, a location of the lock, authorization codes to unlock the lock, etc. These systems may be susceptible to being remotely hacked because the exchange of data is occurring over a wireless network. If the system is hacked, the hacker may gain access to the lock (e.g., to lock and unlock the lock) and read any data exchanged between the lock and the server as well as any data stored on the lock or the server. The locks 10 of the present disclosure do not include components capable of wireless communication with the server 300 over a network. Accordingly, the locks 10 eliminate the ability to be remotely hacked. Additionally, in some embodiments, the locks 10 of the present disclosure do not include active power sources (e.g., batteries). In such embodiments, the locks 10 are incapable of being remotely accessed (e.g., by a hacker who is not physically present in proximity with the locks 10).

In some embodiments, the locks 10 may be used for a LOTO procedure in an explosive environment (e.g., atmosphères explosibles (ATEX) environments, chemical plants, oil refineries, mines, manufacturing facilities, waste treatment facilities, etc.). Traditionally, locks including active power sources, such as batteries, may be unable to be utilized in explosive environments because of a risk of ignition (e.g., ignition of the lithium-ion materials found in batteries of traditional locks), chemical hazards, regulatory compliance, or other factors. Because the locks 10 do not include active power sources and do not store energy, they are capable of being more readily utilized in such explosive environments.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, is understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps It is important to note that the construction and arrangement of the lock 10, the lock system 200, the lock 10, and the components thereof as shown in the various exemplary embodiments is illustrative only. Additionally, any element disclosed in one embodiment may be incorporated or utilized with any other embodiment disclosed herein.

What is claimed is:

1. A lock system comprising:

a lock including:

a locking mechanism selectively movable between a first position and a second position;

an induction coil configured to inductively couple with a portable device to generate power;

an actuator configured to actuate between a locked configuration and an unlocked configuration to selectively transition the locking mechanism between a locked state and an unlocked state in response to receiving the power generated with the induction coil, the actuator including:

an actuator head defining a pocket, the actuator head rotatable between the locked configuration and the unlocked configuration; and a motor coupled with the actuator head, the motor configured to, in response to receiving the power generated with the induction coil, rotate the actuator head between the locked configuration and the unlocked configuration, thereby transitioning the locking mechanism between the locked state and the unlocked state; and a controller electrically coupled to the induction coil, the actuator, and the motor;

wherein the induction coil is configured to supply the power to the controller.

2. The lock system of claim 1, wherein the locking mechanism includes:

a shackle selectively repositionable from the first position to the second position when the locking mechanism is in the unlocked state; and a bearing configured to (i) engage with an exterior surface of the actuator head and a notch of the shackle during the locked configuration to selectively retain the shackle in the first position and (ii) engage with the pocket of the actuator head during the unlocked configuration permit repositioning the shackle to the second position.

3. The lock system of claim 1, wherein the lock includes a communication device, and wherein the communication device is powered with the power generated with the induction coil to facilitate wireless data transfer.

4. The lock system of claim 3, wherein the communication device has a short range communication capability to facilitate the wireless data transfer with the portable device.

5. The lock system of claim 3, wherein the communication device has a long range communication capability to facilitate the wireless data transfer with a server.

6. The lock system of claim 1, further comprising a server configured to communicate with the portable device over a network, wherein the server and the lock are unable to directly communicate with each other.

7. The lock system of claim 6, wherein the server is configured to:

receive, in response to the portable device inductively coupling with the lock, a lock identifier associated with the lock;

receive, in response to the portable device inductively coupling with the lock, a user identifier associated with the portable device; and determine, based on the lock identifier and the user identifier, whether the portable device is authorized to access the lock.

8. The lock system of claim 7, wherein the server is configured to provide access authorization to the portable device over the network in response to a determination that the portable device is authorized to access the lock.

9. The lock system of claim 8, wherein the actuator is reconfigurable between the locked configuration and the unlocked configuration to selectively transition the lock between the locked state and the unlocked state in response to receiving a command from the portable device that has been provided the access authorization.

10. A lock system comprising:

a lock including:

a locking mechanism selectively movable between a first position and a second position;

an induction coil configured to inductively couple with a portable device to generate power;

a housing defining an interior chamber;

a support structure disposed within the interior chamber to support the induction coil, the actuator, and the locking mechanism within the interior chamber;

an actuator configured to actuate between a locked configuration and an unlocked configuration to selectively transition the locking mechanism between a locked state and an unlocked state in response to receiving the power generated with the induction coil; and a controller electrically coupled to the induction coil and the actuator;

wherein the induction coil is configured to supply the power to the controller; and

wherein at least one of:

(a) the housing includes a plurality of first ribs, the support structure includes a plurality of second ribs positioned to align with one or more of the plurality of first ribs of the housing when the support structure is disposed within the interior chamber, and one or more of the plurality of first ribs and one or more of the plurality of first ribs are positioned to at least partially support the locking mechanism and facilitate translation of the locking mechanism between the first position and the second position;

(b) the locking mechanism includes a shackle selectively translatable from the first position to the second position when the locking mechanism is in the unlocked state, the locking mechanism includes a bearing, the support structure includes a recess extending laterally therealong and configured to facilitate lateral translation of the bearing, the bearing is configured to engage a notch of the shackle during the locked configuration to selectively retain the shackle in the first position, and the bearing is configured to translate along the recess to permit repositioning the shackle to the second position; or (c) the housing includes a first shell defining one or more first interfaces and a second shell defining one or more second interfaces, and the one or more first interfaces engage with the one or more second interfaces.

11. The lock system of claim 10, wherein the induction coil is positioned between the support structure and an exterior wall of the housing.

12. The lock system of claim 11, wherein the controller is a printed circuit board positioned proximate a bottom of the induction coil and oriented substantially perpendicular thereto.

13. The lock system of claim 10, wherein:

the housing includes the plurality of first ribs;

the support structure includes the plurality of second ribs positioned to align with one or more of the plurality of first ribs of the housing when the support structure is disposed within the interior chamber; and one or more of the plurality of first ribs and one or more of the plurality of first ribs are positioned to at least partially support the locking mechanism and facilitate translation of the locking mechanism between the first position and the second position.

14. The lock system of claim 10, wherein:

the locking mechanism includes the shackle selectively translatable from the first position to the second position when the locking mechanism is in the unlocked state;

the locking mechanism includes the bearing;

the support structure includes the recess extending laterally therealong and configured to facilitate lateral translation of the bearing;

the bearing is configured to engage the notch of the shackle during the locked configuration to selectively retain the shackle in the first position; and the bearing is configured to translate along the recess to permit repositioning the shackle to the second position.

15. The lock system of claim 10, wherein the housing includes the first shell defining the one or more first interfaces and the second shell defining the one or more second interfaces, and wherein the one or more first interfaces engage with the one or more second interfaces.

16. The lock system of claim 15, wherein the first shell and the second shell are ultrasonically welded together.

17. A lock selectively transitionable between a locked state and an unlocked state, the lock comprising:

a housing defining an interior chamber a first plurality of ribs;

a support structure disposed within the interior chamber, the support structure defining a first recess, a plurality of supports, and a second plurality of ribs, at least one of the plurality of supports positioned to engage with at least one of the first plurality of ribs;

a shackle at least partially received within the interior chamber, the shackle having a notch, and configured to selectively translate between a first position and a second position, at least a portion of the shackle engages with one or more of the first plurality of ribs and one or more of the second plurality of ribs;

a bearing positioned within the interior chamber and configured to engage with the notch of the shackle and the first recess of the support structure when the shackle is in the first position;

a motor disposed within the housing, at least one of the plurality of supports positioned to support the motor, the motor including a lead;

a gear assembly coupled to the motor;

a retainer coupled to the gear assembly, the retainer defining a second recess, the retainer rotatable between a locked configuration and an unlocked configuration, wherein, when the lock is transitioned into the unlocked state, the motor rotates the retainer into the unlocked configuration such that the second recess aligns with the bearing to permit lateral translation of the bearing such that, during translation of the shackle from the first position to the second position, the bearing translates relative to the first recess of the support structure and the notch of the shackle into engagement with the second recess of the retainer, thereby permitting translation of the shackle from the first position to the second position;

an induction coil positioned between a wall of the housing and the support structure; and a printed circuit board positioned at a lower end of the induction coil and oriented substantially perpendicular thereto, the printed circuit board defining an interface to which the lead connects;

wherein the induction coil is configured to be inductively coupled to an external device to generate power that is provided to the printed circuit board and then provided by the printed circuit board to the motor to power the motor to rotate the retainer between the locked configuration and the unlocked configuration.

18. A lock selectively transitionable between a locked state and an unlocked state, the lock comprising:

a housing defining an interior chamber;

a shackle at least partially received within the interior chamber, including a cavity, and configured to selectively translate between a first position and a second position;

at least one bearing configured to engage with the cavity when the shackle is in the first position;

an actuator head including a pocket, the actuator head rotatable between a locked configuration and an unlocked configuration, wherein, when the lock is in the unlocked state, the actuator head is in the unlocked configuration such that the pocket faces laterally outwards to create a space to permit lateral translation of the bearing such that, during translation of the shackle from the first position to the second position, the cavity biases the bearing laterally inwards within the space to engage with the pocket of the actuator head, thereby permitting translation of the shackle from the first position to the second position;

a motor operatively coupled with the actuator head to selectively rotate the actuator head between the locked configuration and the unlocked configuration;

an induction coil configured to (i) receive power from a user device including an inductive power source in response to inductively coupling with the inductive power source and (ii) supply the power received from the inductive power source to the motor to transition the lock between the locked state and the unlocked state, thereby wirelessly powering the motor; and a support structure configured to be disposed within the interior chamber of the housing and support the shackle, the actuator head, the motor, and the induction coil, the support structure including a recess extending laterally along the support structure and configured to facilitate lateral translation of the bearing.

* * * * *